United States Patent Office 3,403,072
Patented Sept. 24, 1968

3,403,072
HYDROGENATED DIENE POLYMERS FOR BONDING ETHYLENE COPOLYMER RUBBERS TO A VULCANIZABLE RUBBER BODY
Robert C. Wheat, Bartlesville, Okla., assignor to Phillips Petroleum Company, a corporation of Delaware
No Drawing. Filed Jan. 28, 1963, Ser. No. 254,495
8 Claims. (Cl. 161—253)

This invention relates to laminates of rubbery ethylene copolymers and a vulcanizable rubber. In another aspect the invention relates to a method for the bonding of vulcanizable rubber. In another aspect the invention relates to a method for the bonding of vulcanizable rubbers to ethylene copolymer rubbers. In another aspect the invention relates to a laminate comprising in series ethylene-propylene rubber, a partially hydrogenated diene polymer and a vulcanizable rubber body.

Elastomers obtained by copolymerizing ethylene with other alpha-olefins in a weight ratio of between about 80 to 20 and 20 to 80, respectively, are known in the art and various procedures have been developed for the synthesis of such rubbers. It has also been found that these rubbers can be compounded and cured to provide vulcanizates having good physical properties. However, their use in the fabrication of laminated structures, such as tires, in which other rubbers, such as the well-known butadiene-styrene copolymer (SBR rubber), are included as a component have been limited because these rubbers frequently do not bond strongly to each other. For example, in bonding an ethylene-propylene rubber tread to a carcass made of SBR or vice versa by ordinary methods, separation frequently occurs when the tire is placed in service.

It is an object of the invention to provide a method for bonding rubbery copolymers of ethylene to vulcanizable rubber body.

It is another object of the invention to provide a novel laminate comprising a rubbery copolymer of ethylene, a hydrogenated diene polymer and a vulcanizable rubber body, e.g., a butadiene-styrene rubber.

These and other objects of the invention will be readily apparent to those skilled in the art from the following disclosure and claims.

These objects are broadly accomplished by bonding a rubbery copolymer of ethylene to a vulcanizable rubbery polymer by intimately contacting said rubbery components with an intermediate body of a partially hydrogenated diene polymer and curing said rubbery components while in contact with said hydrogenated diene polymer.

A number of high polymers of aliphatic mono-olefins have been prepared, the most important of which have been made available through recently developed polymerization catalysts. Some of these polymers have physical properties similar to those of rubber. The present invention is directed to a rubbery copolymer of ethylene and at least one alpha-olefin having the structure RCH=CH$_2$ where R is a C$_1$ to C$_8$ alkyl radical, and the amount of the ethylene in the polymer is at least 20, preferably 30, weight percent of the total polymer. The presently preferred rubbery copolymer is prepared from ethylene and propylene. The rubbery copolymers employed herein are further distinguishable over the thermoplastic ethylene-propylene copolymers by at least the following two physical properties: (a) the rubbery copolymer is at least 80 percent, preferably at least 90 percent, soluble in toluene at 30° C., (b) the Shore D hardness is not greater than 20, preferably not greater than 15. While these alpha-olefin rubbery polymers have elastomeric properties, they are frequently not convenient to cure. Unlike natural rubber, SBR or butyl rubber, they contain essentially no ethylenic unsaturation which can be sulfur cured. Thus, the curing procedure familiar to the trade cannot necessarily be used. Alternative methods for curing, such as the use of high energy radiation or the employment of organic peroxides, are more expensive, limit the choice of anti-oxidants which can be incorporated in the uncured elastomer, and may result in an undesirable odor. A number of methods have been proposed for the introduction of unsaturation or an olefinic linkage into the copolymer, thereby rendering the polymeric product vulcanizable by conventional means, such as with sulfur or sulfur yielding materials. One of these methods includes the inclusion of diene compounds in the polymerization recipe, such as dicyclopentadiene, so that a terpolymer is formed of ethylene, propylene and dicyclopentadiene, or the like. Preferably the diene compound is a non-conjugated diene. Suitable diolefins include, besides dicyclopentadiene, 1,4-pentadiene, 1,5-hexadiene, 2-methyl-1,5-hexadiene, 1,7-octadiene, 1,9-decadiene, and 1,19-eicosadiene. The expression, as used herein, of copolymers of ethylene includes not only simple copolymers of ethylene and propylene or ethylene and other alpha-olefins but also includes terpolymers of ethylene, other alpha-olefins and a third monomer employed in the copolymerization step to introduce unsaturation, such as the diolefins hereinbefore discussed. Generally, the additional monomer, e.g., dicyclopentadiene is present in an amount not greater than 15 weight percent based on total polymer weight. Preferably, this monomer contains not less than two olefinic unsaturated carbon to carbon linkages and preferably a non-substituted hydrocarbon.

These rubbery copolymers are frequently prepared by the use of catalysts generally known as coordination catalysts. These are made from components of two types: first, compounds of transition heavy metals in Groups IV, V, VI and VIII, e.g., titanium, vanadium, molybdenum, and chromium; and second, organometallic compounds, hydrides, and free metals of Groups I, II and III. The compounds of the first type are preferably halides, oxyhalides and alcoholates, the preferred metals being titanium and vanadium. The metals of the component of the second type are preferably lithium, sodium, magnesium and aluminum and the organic portions are preferably alkyl radicals. In these organometallic compounds, the valences of the metal may be partially satisfied by halogen or an alkoxyl, provided, that in the compound there is at least one metal to carbon bond. Mixtures of two or more compounds of the type described above may often be used to advantage, for example, a mixture of diethylaluminum chloride with ethylaluminum dichloride frequently identified as ethyl aluminum sesquichloride. Mixtures of the compounds of the first type can also be employed.

One suitable method for the preparation of rubbery ethylene-propylene copolymers and the like is by contacting the ethylene, propylene and dicyclopentadiene in solution with a specific coordination catalyst, e.g., those prepared by mixing vanadium tetrachloride or vanadium oxytrichloride with a reducing compound, such as an R$_3$Al or R$_2$AlX where R is C$_1$ to C$_{13}$ alkyl and X is a chlorine atom or bromine atom with a presently preferred organo-aluminum compound, such as the above-mentioned ethyl aluminum sesquichloride, at temperatures between about 20° C. and 60° C. in the absence of oxygen and water vapor. The copolymers obtained as a result of this type of process are rubbery high molecular weight elastomers generally exhibiting intrinsic viscosities in tetrachlorethylene at 30° C. of at least 1.0 and are millable and capable of being cured to form strong, resilient, high tensile strength elastomers. However, the catalyst and method of preparation of the rubbery ethylene copolymers are not meant to be limiting on the scope of the invention and any suitable method for the preparation of the elastomeric ethylene copolymer is within the scope of the invention.

It has now been found that these rubbery ethylene-propylene polymers (for purposes of simplicity, the remainder of this discussion is directed to ethylene-propylene rubbery copolymers (EPR), although this is not intended to be a limitation) may be bonded to vulcanizable rubbers by interposing a layer of a hydrogenated diene polymer between compound layers of EPR and the vulcanizable rubber and curing the resulting structure. The discussion is also directed primarily to the employment of butadiene-styrene copolymers (SBR) but this is exemplary only. Other compositions of natural or synthetic rubbers can be bonded to EPR with partially hydrogenated diene polymers, including natural rubber, butadiene rubbers, isoprene rubbers, chloroprene rubbers, acrylate-butadiene rubbers, isobutylene-isoprene rubbers, nitrile-butadiene rubbers, nitrile-chloroprene rubbers, pyridine-butadiene rubbers, styrene-butadiene rubbers, styrene-chloroprene rubbers, styrene-isoprene rubbers, polysulfide polymers, chlorosulfonated polyolefins such as polyethylene and/or polypropylene, fluorocarbon elastomers, and the like. The invention is also applicable to the bonding of EPR type rubbers to each other with the hydrogenated diene polymers.

A number of methods have been proposed for the preparation of the hydrogenated diene polymers. One suitable method is disclosed in U.S. Patent No. 2,864,809, wherein diene polymers are hydrogenated, preferably in a solvent in the presence of specially prepared nickel-kieselguhr catalysts. These products are characterized by their decreased solubility in many common solvents, their increased tensile strength, their increased resistance to ozone deterioration and the lower degrees of unsaturation when compared to the unhydrogenated polymer. These materials range from rubbery to resinous thermoplastics depending on the degree of hydrogenation. Unless completely saturated in the hydrogenation step, they can be vulcanized by conventional methods using sulfur or sulfur donors, and the like. They can be compounded and processed by methods known to the art using the usual fillers, plasticizers, tackifiers, softeners, accelerators, retarders, accelerator activators, and the like, well known in the art.

The diene polymers which are to be hydrogenated to produce the bonding stocks of the invention are preferably homopolymers of 1,3-butadiene although copolymers of butadiene with copolymerizable monomers containing a $CH_2=C<$ group, such as styrene, acrylonitrile, or the like, can be employed. Also instead of 1,3-butadiene, other conjugated dienes containing from 5 to 8 carbon atoms may be employed, such as, for example, chloroprene, isoprene, 1,3-pentadiene, and the like. The hydrogenated diene polymers may be prepared by any suitable method. The diene polymers employed may be prepared by any suitable method such as by emulsion polymerization. One suitable method for producing the hydrogenated diene polymers comprises admixing (A) a substantially gel-free rubbery homopolymer of butadiene, for example, having a Mooney viscosity (ML-4) of 10 to 40, said polymer having been prepared by an emulsion polymerization process at a temperature of 20 to 60° F. and subsequently dried in an inert atmosphere at a temperature below about 50° F.; (B) a solvent and disperser for said polybutadiene; and (C) 10 to 15 percent by weight based on said polybutadiene of a nickel-kieselguhr catalyst having a particle size of 1 to 8 microns which has been activated by contact with hydrogen at a temperature of 500 to 800° F.; contacting the mixture with hydrogen for 2 to 8 hours at a temperature of 400 to 600° F. at a pressure of 400 to 600 p.s.i.g. and recovering a product having a residual unsaturation of less than 50 percent of that theoretically present in the original polybutadiene.

The hydrogenated diene polymer employed as a bonding agent herein should have its unsaturation reduced to a value of approximately 0 to 50 percent, based upon the theoretical value of 100 percent for the unhydrogenated diene polymer; preferably, the hydrogenated polymer will contain from 5 to 30 percent residual unsaturation; even more preferably, less than 20 percent.

At least two of the polymers forming the laminate of the invention are compounded in suitable recipes. Preferably the ethylene-propylene rubber and the butadiene-styrene rubber contain any of the compounding agents known in the rubber compounding art; for example, vulcanizing agents, accelerators, fillers, activators, antioxidants and plasticizers are compounded therewith so as to provide compositions having a wide variety of different properties. It is not necessary that the compound recipes be similar for all three laminae.

Curing can be accomplished in times and at temperatures already known in the art for rubber curing. For example, a curing time between 10 seconds and one hour is generally employed. The temperature of curing is generally between 250° F. and 400° F. Generally any method sufficient to cure a given vulcanizable rubber composition is sufficient to bond the same composition to the partially hydrogenated polydiene. For example, the ethylene-propylene rubbers, the butadiene-styrene rubbers, and the hydrogenated polybutadiene rubbers may be cured at 320° F. for 30 minutes.

The simplest technique for laminating the partially hydrogenated polybutadiene with the EPR and the SBR is to merely interpose the sheet or the body of the partially hydrogenated polybutadiene between the sheets or films or bodies of the EPR and the SBR. After interposing the hydrogenated polybutadiene between the sheets or films of the rubbery materials, a sufficient pressure is applied to provide intimate contact of the several layers of the laminate. A pressure in the range of 25 to 400 pounds per square inch is suitable for application to the laminates in contact during the bonding. Higher or lower pressure can be employed provided a good contact between the materials is made.

Alternatively, a solution of the partially hydrogenated polybutadiene or partially hydrogenated polybutadiene composition in a volatile solvent is employed on either or both the rubbery surfaces. Materials such as benzene, chlorobenzene, toluene, xylene, and other volatile aromatic hydrocarbons or chlorinated aromatic hydrocarbons are particularly effective as solvents. Methylene chloride, trichloromethane and carbon tetrachloride are also superior solvents. Whether the partially hydrogenated polybutadiene is applied as a sheet or a solute in a volatile solvent, a minimum thickness of about 3 mils of partially hydrogenated polybutadiene between materials being joined is preferred. Where the building up of thick layers is not objectionable, intermediate layers of partially hydrogenated polybutadiene 10 mils thick or thicker may be used. The solutions are applied in a single or repeated application by spraying, dipping or painting, for example. On evaporation of the solvent, partially hydrogenated polybutadiene remains as a coating or film on the rubber. Bonding of the sheet by heat and pressure then follow. Frequently, it may be desirable to incorporate suitable curatives in this hydrogenated diene solution.

The invention is best illustrated by the following examples.

A series of laminated structures was prepared in which an ethylene-propylene rubber was bonded to a butadiene-styrene rubber through an intermediate lamina of hydrogenated polybutadiene. Two types of structures were prepared, one in which the laminate was built up as a sandwich, the other in which the laminae were joined edge to edge, the rubbers and hydrogenated polybutadiene being compounded prior to assembling in the mold.

For the sandwich laminates the butadiene-styrene and the ethylene-propylene rubbers containing the compounding ingredients were sheeted out to a thickness of approximately 0.035 inch and the hydrogenated polybutadiene containing compounding ingredients to about 0.010 inch.

From the sheeted materials, pieces 6″ x 6″ were cut and laid up in the mold with the hydrogenated polybutadiene sheet between the rubbers. At one side of the mold, a piece of aluminum foil 2″ x 6″ was placed between the layers to prevent adhesion. The mold was then closed and the polymer laminate cured by heating at 320° F. for 30 minutes. The laminate was then removed from the mold and cut into 1″ x 6″ strips in a direction such that the end of each strip was unbonded because of the aluminum foil. These strips were tested in a Scott tensile machine by attaching the grips to pull the ethylene-propylene rubber layer away from the hydrogenated butadiene-SBR combination. In addition, control runs were made with no intermediate bonding layer. This peel-type test was made at 80° F. pulling at 2″/minute. Data on these tests are shown below.

For the edge-to-edge laminates the above rubbers and the hydrogenated polybutadiene were compounded and sheeted out to a thickness of 0.080 inch. Strips of rubber 2½″ x 6″ were cut and placed in the mold with a 1″ x 6″ strip of hydrogenated polybutadiene interposed between. The mold was closed and polymer samples cured by heating for 30 minutes at 320° F. Tensile specimens were cut across the slab in a manner such that the hydrogenated polybutadiene strip was centrally located in the narrow portion. A portion of the test specimens were pulled at 2″/minute in the Scott tensile machine at 80° F. and 158° F. The remainder were aged 24 hours at 212° F. after which they were pulled in the machine at 80° F. In addition, control runs were made with no intermediate bonding layer. Data on these tests are shown in the following tabulations:

TABLE I.—COMPOUNDING RECIPE

| Run | I | J | K | L | M |
|---|---|---|---|---|---|
| Ethylene-propylene rubber A [1] | 100 | | | | |
| Ethylene-propylene rubber B [2] | | 100 | | | |
| Philprene 1,500 [3] | | | 100 | | |
| Hydropol, type I [4] | | | | 100 | 100 |
| Titanium dioxide | | | | 50 | |
| Philblack A [5] | | | | | 50 |
| IRB #1 (high abrasion black) | 50 | 50 | 50 | | |
| Zinc oxide | 5 | 5 | 3 | 5 | 5 |
| Stearic acid | 1 | | 1 | 2 | 2 |
| Calcium stearate | | 1 | | | |
| Agerite alba [6] | | | | 1 | 1 |
| Flexamine [7] | | | 1 | | |
| Necton 60 [8] | 20 | | | | |
| Circo lite oil [9] | | | | 10 | 20 |
| Philrich 5 [10] | | | 10 | | |
| Sulfur | 1.5 | 0.32 | 1.75 | 2 | 1.75 |
| Monex [11] | 1.5 | | | | |
| Captax [12] | 0.5 | | | | |
| DiCup (recrystallized) [13] | | 2.7 | | | |
| Santocure [14] | | | 1.2 | 1.0 | |
| NOBS special [15] | | | | | 2.0 |
| A-32 [16] | | | | 0.2 | |
| CURED 30 MINUTES AT 320° F. | | | | | |
| 300% modulus, p.s.i. [17] | 1,100 | 1,035 | 1,360 | 1,120 | |
| Tensile, p.s.i. [17] | 2,640 | 2,780 | 3,620 | 1,940 | 3,240 |
| Elongation, percent [17] | 505 | 565 | 590 | 410 | 265 |
| Tear resistance, lb./in. [18] | 160 | 210 | 300 | 240 | 285 |

[1] DuPont EPR, ECD 330, ethylene-propylene-non-conjugated terpolymer of 35 mol percent propylene with the balance predominately ethylene, 73 ML-4 at 212° F., 92% soluble in toluene* at 30° C. and a Shore D hardness of 7.5 (ASTM D-676-58T).
[2] Enjay EPR, MD-460, ethylene-propylene copolymer of 46 mol percent ethylene, 54 mol percent propylene, 42.5 ML-4 at 212° F. (ASTM D-927-49T), 89% soluble in toluene* at 30° C. and a Shore D hardness of 7 (ASTM D-676-58T).
[3] A butadiene-styrene copolymer polymerized in an emulsion at approximately 41° F. using a rosin acid soap.
[4] Hydrogenated polybutadiene, 12.1% unsaturation, density 0.907 gm./cc., crystalline freeze point 195° F.
[5] Fast extruding furnace black.
[6] Hydroquinone monobenzyl ether.
[7] 65% diarylamine-ketone reaction product and 35% N,N′-diphenyl-p-phenylenediamine.
[8] Mineral oil.
[9] Odorless, light gold colored oil; specific gravity 0.932, Saybolt viscosity at 100° F. about 155 seconds.
[10] Aromatic petroleum oil.
[11] Tetramethyl thiuram disulfide.
[12] 2-mercaptobenzothiazole.
[13] Di(α,α′-dimethylbenzyl)peroxide.
[14] N-cyclohexyl-2-benzothiazole sulfanamide.
[15] N-oxydiethylene benzothiazole-2-sulfanamide.
[16] Reaction product of butyraldehyde and butylidene aniline.
[17] ASTM-D-624-54. Die A.
[18] ASTM-D-412-61T. Die C.

*Toluene solubility of rubber polymers (or gel). One-tenth to 0.18 gm. of rubbery polymer is placed in a cage and the cage and contents weighed to the nearest 0.1 mg. The cage is then closed and placed in a 4 oz. wide mouth bottle into which exactly 100 ml. of reagent grade toluene is pipetted. The bottle is capped tightly and placed in the dark at about 30° C. for at least 24 hours and preferably not more than 48 hours without shaking or stirring of the contents. The weight of the remaining gel is then determined by subtracting the weight of the cage from the total weight of the cage plus contents, both weights determined after vacuum drying at 70-80° C. for one hour and cooling to room temperature. The weight percent of the polymer insoluble in toluene is then calculated therefrom.

TABLE II

| Laminate sandwich | Peel strength, p.s.i., measured at 80° F. |
|---|---|
| I to L to K | 25.0 |
| I to M to K | 22.0 |
| J to L to K | 20.5 |
| J to M to K | 21.0 |
| I to K (Control) | 9.5 |
| J to K (Control) | 10.2 |

| Edge to edge laminate | Measured at 80° F. | Tensile Strength | |
|---|---|---|---|
| | | Measured at 158° F. | Aged 24 hr. at 212° F. |
| I to L to K | 1,970 | 670 | 1,560 |
| I to M to K | 1,595 | 750 | 850 |
| J to L to K | 990 | 425 | 985 |
| J to M to K | 1,160 | 850 | 1,270 |
| I to K (Control) | 465 | 230 | 615 |
| J to K (Control) | 285 | 125 | 390 |

These data show that interposing a layer of hydrogenated polybutadiene between ethylene-propylene rubber and butadiene-styrene rubber in a laminated structure increases bonding strength by 101 to 165 percent in sandwich laminates and by 250 to 325 percent in edge-to-edge laminates (original tensile). They also show that when aged at elevated temperature, the splices continue to show significant advantages when bonded with hydrogenated polybutadiene.

Although specific examples, structure, compositions and process steps have been described for purposes of illustration, the invention is not limited to these. Variation and modification within the scope of the disclosure and the claims can readily be effected by those skilled in the art.

I claim:

1. A laminated structure comprising in order (A) a rubbery polymer comprising ethylene and at least one alpha olefin having the structure $RCH=CH_2$, wherein R is a $C_1$ to $C_8$ alkyl radical wherein the amount of ethylene in the polymer is at least 20 percent by weight of the total polymer and wherein the polymer is at least 80 percent soluble in toluene at 30° C. and the Shore D hardness is not greater than 20, (B) a partially hydrogenated diene polymer, and (C) a vulcanizable rubbery body.

2. A laminated structure according to claim 1 further characterized in that the rubbery polymer contains from 80 to 20 weight percent of ethylene with 20 to 80 weight percent of propylene, the diene polymer is a partially hydrogenated polybutadiene containing less than 50 percent of the unsaturation present in the unhydrogenated material and the vulcanizable rubbery body is a butadiene-styrene copolymer.

3. A laminated structure according to claim 2 further characterized in that the partially hydrogenated polybutadiene is sandwiched between the rubbery polyer of ethylene and propylene and the butadiene-styrene copolymer.

4. A laminated structure according to claim 1 further characterized in that the ethylene alpha olefin polymer contains a nonconjugated diene.

5. A laminated structure according to claim 4 wherein said nonconjugated diene is dicyclopentadiene.

6. A method for forming a laminated structure comprising, a rubbery polymer of ethylene and at least one alpha olefin having the structure $RCH=CH_2$, wherein R is a $C_1$ to $C_8$ alkyl radical, wherein the polymer contains at least 20 weight percent of ethylene based on the total weight of said polymer and wherein the polymer is at least 80 percent soluble in toluene at 30° C. and the Shore D hardness is not greater than 20, bonded to a vulcanizable rubbery body, comprising the steps of intimately contacting said rubbery components with an intermediate body of a partially hydrogenated diene polymer and curing at least one of said rubbery components while in contact with said partially hydrogenated diene polymer.

7. The method of claim 6 further characterized in that said vulcanizable rubbery body is a butadiene-styrene copolymer.

8. The method of claim 6 further characterized in that the intermediate diene polymer is partially hydrogenated polybutadiene and has a thickness of at least 3 mils.

References Cited

UNITED STATES PATENTS

| 3,024,813 | 3/1962 | Sear et al. | 161—253 X |
| 3,035,953 | 5/1962 | Arnold | 161—253 X |
| 3,090,715 | 5/1963 | Clark et al. | 161—253 X |
| 3,264,168 | 8/1966 | Sneary | 161—227 |

EARL M. BERGERT, *Primary Examiner.*

CLIFTON B. COSBY, *Assistant Examiner.*